(12) United States Patent
Arthurs et al.

(10) Patent No.: US 7,179,521 B2
(45) Date of Patent: Feb. 20, 2007

(54) MULTILAYER SHRINK FILM FOR HIGH SPEED PACKAGING LINES

(75) Inventors: Trevor Arthurs, Truro (CA); Shane Taghavi, Truro (CA)

(73) Assignee: Central Products Company, Menasha, WI (US)

( * ) Notice: Subject to any disclaimer, the term of this patent is extended or adjusted under 35 U.S.C. 154(b) by 0 days.

(21) Appl. No.: 10/792,015

(22) Filed: Mar. 3, 2004

(65) Prior Publication Data
US 2004/0234800 A1 Nov. 25, 2004

Related U.S. Application Data

(60) Provisional application No. 60/473,167, filed on May 23, 2003, provisional application No. 60/451,236, filed on May 3, 2003.

(51) Int. Cl.
*B32B 27/32* (2006.01)
(52) U.S. Cl. ............ 428/213; 264/173.14; 264/173.15; 264/456; 264/459; 428/220; 428/516; 428/517; 428/521; 428/910
(58) Field of Classification Search ........... 264/173.14, 264/173.15, 456, 459; 428/213, 219, 220, 428/516, 517, 521, 910
See application file for complete search history.

(56) References Cited

U.S. PATENT DOCUMENTS

| | | |
|---|---|---|
| 4,079,328 A | 3/1978 | Cleland et al. |
| 4,597,920 A | 7/1986 | Golike |
| 4,692,380 A | 9/1987 | Reid |
| 4,976,898 A | 12/1990 | Lustig et al. |
| 5,632,843 A | 5/1997 | Lustig et al. |
| 6,068,936 A | 5/2000 | Peiffer et al. |
| 6,207,093 B1 | 3/2001 | Hanyu et al. |
| 6,376,095 B1 | 4/2002 | Cheung et al. |
| 6,479,138 B1 | 11/2002 | Childress |

OTHER PUBLICATIONS

Lamonte and Mcnally, "Cyclic Olefin Copolymers." Advanced Materials & Processes 159(3), Mar. 2001, p. 33 (Ticona, a business of Celanese AG, Summit, NJ).
Lamonte, "Stiffer, Thinner Packaging Films with Improved Sealing Using Cyclic Olefin Copolymers." 10th Worldwide Flexible Packaging Conference, Amsterdam, Nov. 2000 (Ticona, Summit, NJ).

*Primary Examiner*—D. S. Nakarani
(74) *Attorney, Agent, or Firm*—Roberts, Mardula & Wertheim, LLC

(57) ABSTRACT

A multilayer shrink film and methods of making same comprising high speed polyethylenic outer layers along with one or more cyclic-olefin copolymer (COC) containing inner layers. The multilayer shrink films of the invention are produced using film biaxial orienting means, have haze values of 5 or less and Young's modulus of 50,000 psi or greater and superior hot slip properties. In order to achieve the desired modulus, films of the present invention comprise from 10% to 30% COC and from 2% to 25% softening olefin copolymer. Preferably the film comprises large proportion of linear low density polyethylene (LLDPE). Suitable COCs for use in the invention are limited to single site catalyzed COC.

26 Claims, 4 Drawing Sheets

MULTILAYER SHRINK FILM FOR HIGH SPEED PACKAGING LINES

CROSS REFERENCE TO OTHER PATENT APPLICATIONS

This application claims priority under 35 U.S.C. § 119 from U.S. provisional patent application Ser. No. 60/451,236 filed Mar. 3, 2003 and from U.S. provisional patent application Ser. No. 60/473,167 filed May 23, 2003 of the same inventors, which are incorporated by reference in their entirety.

BACKGROUND OF THE INVENTION

The present invention relates to polyolefin films and biaxially oriented films with improved properties useable as shrink films. In particular, the present invention relates to shrink film for use in packaging lines, although the invention may also be used in other shrink film applications.

Polyolefins, polyvinyl chlorides, ionomers, polyesters, polystyrenes, and polyvinylidene chlorides have all been used in the production of shrink film. The shrinkable polyolefins currently on the market include both cross-linked and non cross-linked oriented polyethylene, oriented polypropylene, and oriented ethylene-propylene copolymers.

A shrink film's distinguishing characteristic is its ability upon exposure to heat to either shrink or, if restrained, to create shrink tension within the film. This ability is activated by the packager when the wrapped product is passed through a hot air or hot water shrink tunnel. This process causes the film to shrink around the product producing a tight, transparent wrapping that conforms to the contour of the product and which is aesthetically pleasing while providing the useful functions required of packaging materials such as protection of the product from loss of components, pilferage, damage due to handling and shipment, dirt and contamination.

Typical items wrapped in polyolefin shrink films are toys, games, sporting goods, stationery, greeting cards, hardware and household products, office supplies and forms, foods, phonograph records, and industrial parts.

The manufacture of shrink films requires sophisticated equipment including extrusion lines with "biaxial orientation" capability. Biaxial orientation can be accomplished with "tenter frame" stretching or "double bubble" blown film extrusion processes. The biaxial orientation causes the material to be stretched in the cross or transverse direction and in the longitudinal or machine direction. The films are usually heated to their orientation temperature range that varies with the different polymers but is usually above room temperature and below the polymer's melting temperature. After being stretched, the film is rapidly cooled to quench it thus freezing the molecules of the film in their oriented state. Upon heating, the orientation stresses are released and the film will begin to shrink back to its original unoriented dimension.

The polyolefin family of shrink films provide a wide range of physical and performance characteristics such as shrink force (the amount of force that a film exerts per unit area of its cross-section during shrinkage), the degree of free shrink (the reduction in surface area a material undergoes when unrestrained), tensile strength (the highest force that can be applied to a unit area of film before it begins to break), sealability, shrink temperature curve (the relationship of shrink to temperature), tear initiation and resistance (the force at which a film will begin to tear and continue to tear), optics (gloss, haze and transparency of material), and dimensional stability (the ability of the film to retain its original dimensions under all types of storage conditions).

In addition to the above, high speed automatic wrapping lines require that the shrink film have high film-film slip (low coefficient of friction), consistently strong static seals, higher stiffness compared to other shrink films and preferably good low temperature shrink initiation (water bath shrinkage is used to simulate low temperature shrink initiation). The strong static seals allow for fast sealing of the packages. Higher stiffness supports high film and packaging line speeds. Stiffness is measured as Young's modulus or "modulus" per ASTM test D 882. Good low temperature shrink initiation is advantageous in permitting lower shrink tunnel temperatures and having reduced shrinkage times (thereby permitting shorter shrink tunnel times).

High slip allows packages to freely pass one another on conveyors without sticking or clinging. Slip may be determined at room temperature or at elevated temperatures. Slip at room temperature is representative of conditions packaged goods encounter during transportation between facilities and during loading and off-loading of packages from transport vehicles.

Packages having high slip at room temperature may still have poor hot slip characteristics. Hot slip is important for operating packaging lines at high speeds. One determinant in line speed is the amount of time required to cool the packages downstream of the shrink oven or chamber. Packages must be cooled to a point where they no longer cling to other packages. For this reason, packages with superior hot slip require less cooling time and therefore allow faster packaging line speeds.

One approach to shrink films for high speed wrapping lines is a multilayer film comprising polyethylenic and polystyrenic layers. The differences between polystyrene and polyethylene layers require intervening compatabilizing layers for successful manufacture. U.S. Pat. No. 6,376,095 to Cheung et al. discloses random interpolymer useful for a compatabilizing layer. Such random interpolymers include the ethylene/styrene interpolymer resins prepared using a constrained-geometry catalyst. Unfortunately, Cheung compositions are presently expensive due to the cost of the interpolymer and may be subject to phase-out by the manufacturer. Films of this genus will hereinafter be referred to as "polystyrene layered."

A similar approach to shrink films using polystyrenic layers are the films disclosed in U.S. Pat. No. 6,479,138 to Childress. The Childress films have a modulus in excess of 40,000 psi and a haze value less than 6. However, the Childress films have the similar problem as the Cheung films in relying upon relatively expensive components. Both the Cheung and Childress films have established a commercial expectation to shrink films for high speed packaging lines having a modulus of 40,000 psi or higher and a haze value less than 5.0.

Another approach to films is use of cyclic-olefin copolymers (COCs). COCs are available commercially from Ticona of Summit, N.J. For example, U.S. Pat. No. 6,068,936 to Peiffer discloses films comprising polyolefins and cyclic-olefin copolymers. However, the Peiffer patent discloses cast films, normally used as stretch films or pouch films, and limits all examples to polypropylene based polyolefins.

Accordingly, it is a general object of the present invention to provide a shrinkable non-polypropylene film having improved properties for high speed packaging lines comparable to those of the polystyrene layered shrink films but without the attendant costs of compositions for compatabilizing layers of such films and with superior hot slip characteristics.

BRIEF SUMMARY OF THE INVENTION

The objects of this invention are multilayer shrink films and methods of making such films. In particular the multilayer shrink films comprise one or more inner layers comprising cyclic-olefin copolymer and linear low-density polyethylene, and one or more outer layers of linear low-density polyethylene, softening olefin copolymer and cyclic-olefin copolymer wherein the shrink film has a modulus of 50,000 psi or greater, good low temperature shrink initiation, a haze value of 5 or less and superior hot slip properties. The multilayer shrink films of the invention are produced using biaxial orientation. Preferred biaxial orientation methods include double-bubble or tenter-frame biaxial orienting processes. In an optional method for crosslinking layers, a collapsed tube or final film of a double bubble biaxial orientation process is exposed to electromagnetic radiation. Films of the present invention have from 10% to 30% cyclic-olefin copolymer and from 2.4% to 25% softening olefin.

BRIEF DESCRIPTION OF THE DRAWINGS

FIG. 5A illustrates results comparing Young's modulus to amount of cyclic-olefin copolymer of example films.

DETAILED DESCRIPTION OF THE INVENTION

Figure 1:
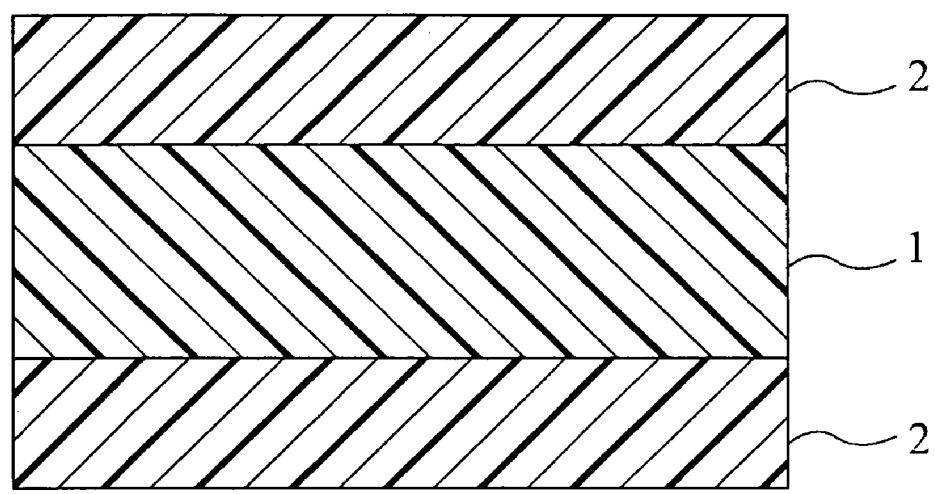
FIG. 1 illustrates a sectional view of one embodiment of the invention having a cyclic-olefin copolymer inner layer and two outer layers.
Figure 2:
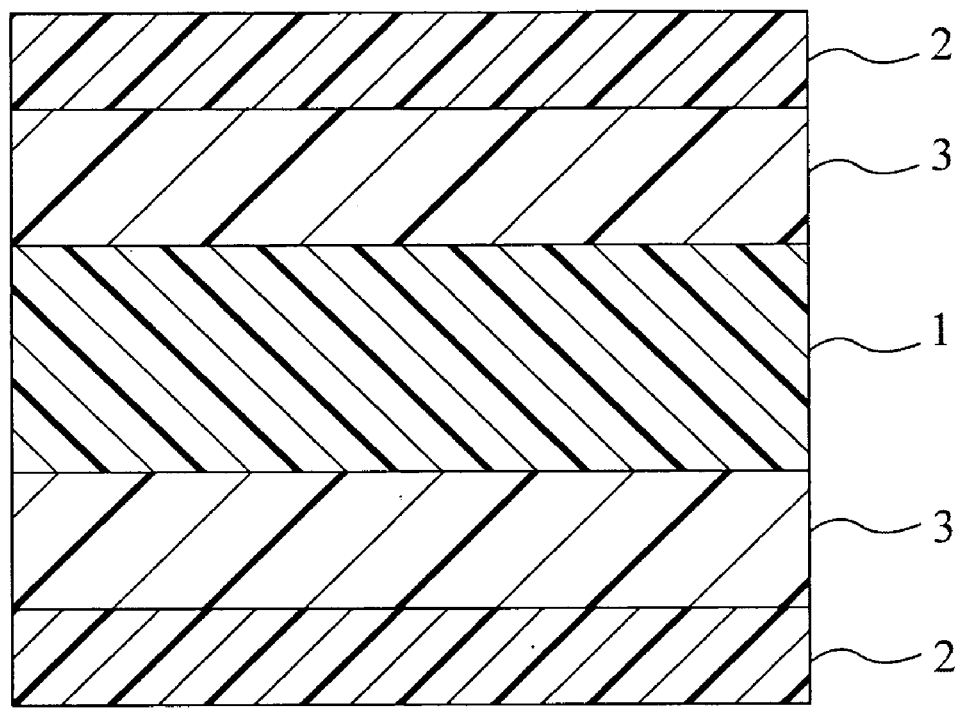
FIG. 2 illustrates a sectional view of one embodiment of the invention having two outer layers, and three cyclic-olefin copolymer inner layers.

The present invention is directed toward multilayer shrink films suitable for use in high speed packaging lines. FIG. 1 and FIG. 2 illustrate sectional views of two different embodiments of the invention. The present invention comprises a high speed multilayer shrink film comprising two high speed polyethylenic outer layers 2 and at least an innermost cyclic-olefin copolymer layer 1. The films of the present invention may also comprise one or more intermediate cyclic-olefin copolymer layer(s) 3.

FIG. 1 illustrates a three layer embodiment of the invention consisting two high speed polyethylenic outer layers 2 and at least an innermost cyclic-olefin copolymer layer 1. In contrast, the embodiment of FIG. 2 is a five layer shrink film further comprising two intermediate cyclic-olefin copolymer layer(s) 3. The embodiment of FIG. 2 is preferred when varying amounts of additives are desired in the various inner layers, for example, UV inhibitors, pigments, metallic pigments, and the like. Intermediate layers 3 of FIG. 2 may otherwise consist of polymer blends and additives similar or equal in composition to innermost layer 1.

The multilayer shrink films of the present invention will have each outermost layer 2 comprising 10–20% by weight of the film. (e.g. 20–40% by weight for two outermost layers). When used in a three layer film (e.g. FIG. 1), inner layer 1 comprises the remainder or 60–80% by weight of the film. When used in a five layer film (e.g. FIG. 2), innermost layer 1 will comprise 30–60% by weight of the film and each other intermediate inner layer 3 will comprise 10–20% by weight. For example, a three layer film may have 70% inner layer and 15% each outermost layer. Similarly, a five layer film may have may have 40% innermost layer, 15% each outermost layer and 15% each remaining inner layer.

As used herein "polyethylenic polymer" refers to ethylenic homopolymers and copolymers that comprise a major proportion by weight of ethylene copolymerized with a minor proportion by weight of an α-olefin monomer containing about 3 to about 12, preferably about 4 to about 10, and more preferably about 4 to about 8, carbon atoms. As used herein polyethylenic polymers do not include propylene copolymers with a propylene content greater than 50% by weight.

Polyethylenic copolymers include those commonly referred to as high density polyethylene (HDPE), low density polyethylene (LDPE), linear low density polyethylene (LLDPE), and very low density polyethylene (VLDPE). Preferably the ethylenic copolymers employed are those having from about 1 to about 20, preferably from about 1 to about 10 weight percent of said higher α-olefin monomer copolymerized therein. In addition, the α-olefin monomer employed in the ethylenic copolymer is preferably selected from the group consisting of 1-butene, 3-methyl-1-butene, 3-methyl-1-pentene, 1-hexene, 4-methyl-1-pentene, 3-methyl-1-hexene, 1-octene and 1-decene. Particularly preferred are the 1-octene α-olefins.

LLDPE resins are prepared at relatively low pressures employing coordination-type catalysts. Reference may be made to U.S. Pat. Nos. 3,645,992, 4,076,698, 4,011,382, 4,163,831, 4,205,021, 4,302,565, 4,302,566, 4,359,561 and 4,522,987 for more details of the manufacture and properties of LLDPE resins including those which are particularly useful herein.

High density polyethylene (HDPE) refers to a homopolymer of ethylene or a copolymer of a major portion by weight of ethylene with one or more α-olefins, the homopolymer or copolymer having a density greater than 0.940 g/cm³, and a melting point between 125° C. and 140° C.

Low density polyethylene (LDPE) refers to a highly branched homopolymer of ethylene having a density between 0.915 and 0.930 g/cm³, typically having long branches off the main backbone chain with alkyl substituents of 2 to 8 carbon atoms on these branches.

Very low density polyethylene (VLDPE) refers to a copolymer of a major portion by weight of ethylene with one or more α-olefins, the copolymer having a density greater than 0.86 and less than 0.915 g/cm³, a melting point between 85° C. and 125° C., and a Vicat Softening Point (VSP) greater than 60° C. Very low density polyethylene (VLDPE) sometimes is also referred to as ultra low density polyethylene (ULDPE).

Linear low density polyethylene (LLDPE) refers to a copolymer of a major portion by weight of ethylene with one or more α-olefins, the copolymer having a density of at least 0.915 g/cm³, a melting point between 115° C. and 130° C., and a Vicat Softening Point (VSP) greater than 60° C.

As used herein "softening olefin" refers to a polyolefin having low modulus and low crystallinity that when blended with polymers and copolymers suitable for shrink films will reduce the modulus of the film, widen the glass transition temperature of the blend and improved shrink initiation (simulated by water bath shrinkage test). Softening olefins are low melting point polymers that include polymers and copolymers of ethylene vinyl acetate (EVA), ethylene methacrylate (EMA), ethylene/methacrylic acid (E/MAA), VLDPE, and elastomeric polymers made of polypropylene and ethylene-propylene diene rubber. Preferably softening olefins are EVA or VLDPE.

As used herein "high speed polyethylenic outer layer" refers to an outer layer of a multilayer film comprising by total weight of the film, 60% or more by weight polyethylenic polymer that has been formulated for use as outer layers in high speed packaging shrink film and further comprises 5% to 15% by weight softening olefin and 10% to 30% by weight cyclic-olefin copolymers. Suitable polyethylenic polymers include film grade polyethylenic polymer. Such polymers typically have a melt flow index of 0.5 to 5.0. Film grade polyethylenic polymers are available commercially from Nova Chemicals, Dow Chemical, Exxon, Union Carbide, Equistar, Mobil and Chevron. Particularly preferred are the LLDPE film grade polyethylenic polymers. Formulations in high speed polyethylenic outer layers provide for film-film slip, low haze, and scratch resistance.

As used herein, "ethylene vinyl acetate copolymer" (EVA) refers to a copolymer formed from ethylene and vinyl acetate monomers wherein the ethylene derived units (monomer units) in the copolymer are present in major amounts (by weight) and the vinyl acetate derived units (monomer units) in the copolymer are present in minor, by weight, amounts. Film grade EVA is available commercially from AT Plastics, Dow Chemical, DuPont, Huntsman and Chevron. Other softening olefins include plastomers available from Dow Chemical and Exxon as well as Suryln® (ethylene/methacrylic acid) available from DuPont.

As used herein, "cyclic-olefin copolymers" (COCs) refer to copolymers built up from cyclic-olefins and comonomers, where the comonomer content is at most 20% by weight, based on the weight of the cyclic-olefin polymer (preferably 1–15% by weight, and most preferably 1–8% by weight). Cyclic-olefins are mono- or polyunsaturated polycyclic ring systems, such as cycloalkenes, bicycloalkenes, tricycloalkenes or tetracycloalkenes. The ring systems can be mono-substituted or polysubstituted. Particularly preferred cyclic-olefins are polynorbornene, polydimethyloctahydronaphthalene, polycyclopentene and poly(5-methyl)-norbornene. Particularly preferred for the invention are non-polar fully amorphous COCs, for example, those formed by polymerizing 2-norbornene with ethylene in presence of a single site catalyst (e.g. metallocene catalyst).

As used herein, "COC shrink film layer" refers to a layer of a multilayer shrink film comprising cyclic-olefin copolymer in an amounts of 10% to 50% by weight of the layer. Selection of a suitable COC resin will depend upon the producer of the COC as well the film manufacturing process employed. In general, film grade COCs produced using single site catalysts are usable. Particularly preferred are such COCs having a glass transition temperature ($T_g$) from 60° C. to 70° C.

Surprisingly it has been found that adding COCs increases the suitability of the film for high speed packaging lines. The COCs improve the shrink initiation but without a corresponding decrease in the modulus of the film. In contrast softening olefins can be used to improve shrink initiation but such results in a reduction in film modulus.

The films of the present invention may be formed by any method known in the art of forming shrink films. Such methods normally consist of biaxially orientation processing equipment. In general, shrink film production can be of any suitable technique including the use of tenter frames and double bubble film processing. The double-bubble process is often referred to as the process described in U.S. Pat. No. 3,555,604 to Pahlke. U.S. Pat. No. 3,555,604 is incorporated herein by reference.

Figure 3:
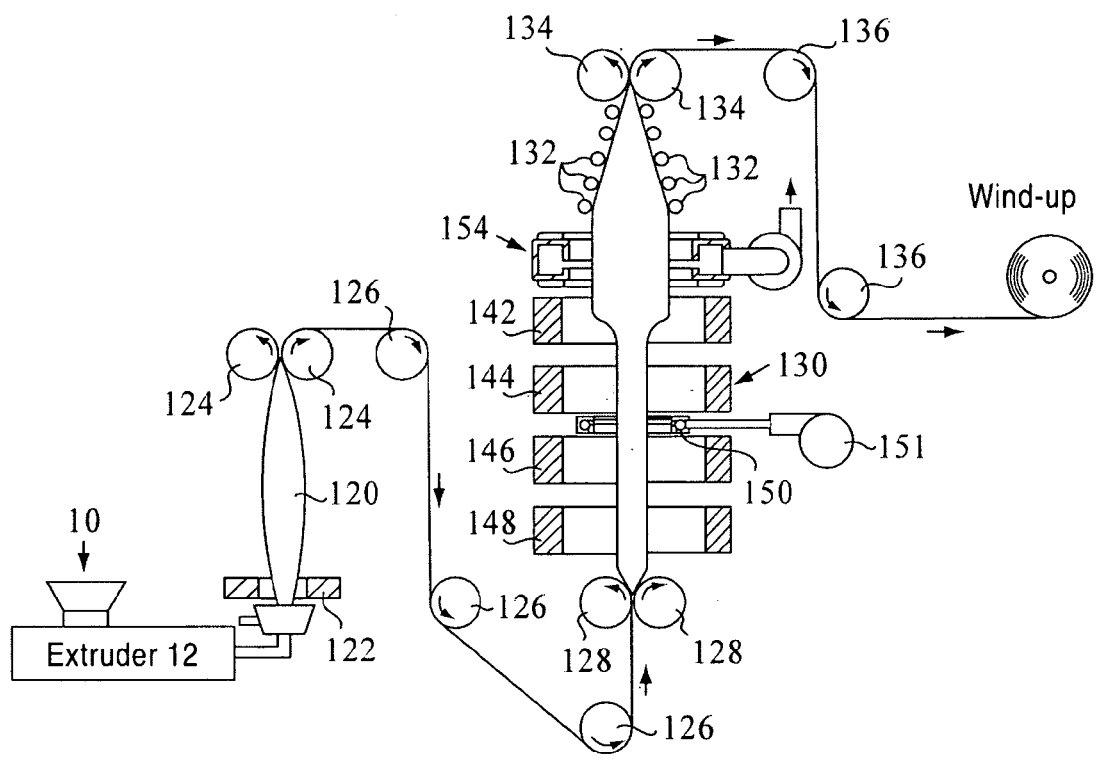
FIG. 3 illustrates a double-bubble process for producing biaxially oriented films.

FIG. 3 illustrates the major components of such a double bubble processing line. The plastic feedstock 10 is fed into extruder 12. A primary bubble 120 forms by inflating the bubble as the melt exits die 122. Primary bubble 120 is cooled and collapsed as it passes through rollers 124. The resulting collapsed tube is then re-inflated to form the second bubble. The second bubble is heated to its draw temperature by means of external heaters 148, 146, 144, and 142. The amount of inflation determines the degree of orientation in the transverse direction. Machine direction orientation is imparted by having speed of the exit rollers 134 greater than the inlet rollers 128.

Features required to properly control the double-bubble process are further described in the Pahlke patent. Such features include special design of extruder die 122, air cooling areas 151 and 154 and guide rollers 132.

For the most part the double-bubble process results in a biaxially oriented film that is simultaneously oriented in both the machine and transverse directions. This is in contrast to the tenter frame processing line where first machine direction orientation is followed by transverse (tenter direction) orientation.

During processing of multilayer polyolefin films, it is often desirable to further enhance the film properties by crosslinking the layers of the film. An exemplary method of crosslinking is the exposure of the film to electromagnetic radiation. In the double bubble process, the irradiating equipment may be situated so as to irradiate the collapsed tube (i.e. between rollers 124 and rollers 128 of FIG. 2) or the final film (i.e. after rollers 134 of FIG. 3).

Cross-linking is achieved either chemically or by the use of irradiation. The benefits of cross-linking include changing thermoplastic materials to improve properties in multi-layer film applications. In multi-layer films, the molecules in these materials tend to slip and slide over one another. As temperature rises, these uncross-linked materials soften and finally melt. Cross-linking severely impedes molecular movement and provides greater stability against heat. The locking together of molecules is the origin of the benefits of cross-linking, which include increase high temperature strength, increased form stability, resistance to deformation, resistance to abrasion, resistance to solvents, improved shrink memory, resistance to slipping of layers, and resistance to stress cracking.

Irradiation may he accomplished by the use of high energy electrons, ultra violet radiation, X-rays, gamma rays, beta particles, and the like. Preferably, electrons are employed up to about 20 megarads (Mrad) dosage level. The irradiation source can be any electron beam generator operating in a range of about 150 kilovolts to about 6 megavolts with a power output capable of supplying the desired dosage. The voltage can be adjusted to appropriate desired levels. Many apparatus for irradiating films are known to those of skill in the art. The chemical effect of electron beam irradiation varies greatly based on the amount of electron energy or dose that a product receives.

A radiation dose is measured in terms of the amount of radiation energy absorbed per unit mass of the material. The traditional unit of dose is the RAD, defined as the absorption of 100 Ergs of energy per gram of material. The Mrad (one million rad) is the practical unit. The S.I. unit is the Gray, defined as the absorption of one Joule of energy per kilogram of material. The Kgray (one thousand gray) is the practical unit. One gray equals 100 rads. 10 Kgray equals one Mrad. The irradiation is usually carried out at a dosage up to about 20 Mrad, typically between about 1 Mrad and about 20 Mrad, with a preferred dosage range of about 2 to about 12 Mrad. Irradiation can be carried out conveniently at room temperature, although higher and lower temperatures, for example, 0° C. to 60° C. may be employed.

Irradiation crosslinking is also useful for increasing the shrink temperature range and the heat seal range for the film structures. For example, U.S. Pat. No. 5,089,321, incorporated herein by reference, discloses multilayer film structures comprising at least one heat sealable outer layer and at least one core layer that have good irradiation crosslinking performance. Among irradiation crosslinking technologies, beta irradiation by electron beam sources and gamma irradiation by a radioactive element such as Cobalt 60 are the most common methods of crosslinking film materials.

U.S. Pat. No. 4,079,328 to Cleland et al. relates to an apparatus for thin film electron beam irradiation. U.S. Pat. No. 4,976,898 to Lustig et al. teaches the utilization of irradiation from 1 to 5 Mrad to provide improved heat sealing properties. U.S. Pat. No. 5,632,843 to Lustig et al. teaches the utilization of irradiation to cross-link multi-layer plastic films. U.S. Pat. No. 4,963,419 to Lustig et al. teaches the utilization of irradiation to improve the physical properties of plastic film. U.S. Pat. No. 4,597,920 to Golike discloses the effects and degrees of irradiation cross-linking at various stages of film making operations. The disclosures of these references are incorporated by reference with respect to irradiation methods and limitations in film manufacturing. These patents teach the use of irradiation crosslinking to improve properties of film layers and also to promote adhesion between layers in multi-layer films.

During use of irradiation of films of the present invention, it was found that the preferred range of irradiation to be 1 to 12 Mrad, more preferably 1.5 to 5 Mrad, and with 2.5 Mrad being a preferred average for most conditions.

An example of the use of tenter frames is disclosed in U.S. Pat. No. 6,207,093 to Hanyu et al. As described in the Hanyu et al. patent, the entire disclosure of which is incorporated herein by reference, the polymer or polymers used to make the film are melted and then passed through an extruder to a slot die mechanism after which it is passed over a first roller, characterized as a chill roller, which tends to solidify the film. The film is then oriented by stressing it in a longitudinal direction, characterized as the machine direction, and in a transverse direction to arrive at a film which can be characterized in terms of orientation ratios, sometimes also referred to as stretch ratios, in both longitudinal and transverse directions.

The machine direction orientation is accomplished through the use of two sequentially disposed rollers, the second or fast roller operating at a speed in relation to the slower roller corresponding to the desired orientation ratio. This may alternatively be accomplished through a series of rollers with increasing speeds, sometime with additional intermediate rollers for temperature control and other functions. After the film has been stressed in the machine direction, it is again cooled and then pre-heated and passed into a lateral stressing section, for example, a tenter frame mechanism, where it is again stressed, this time in the transverse direction. Orientation in the transverse direction is often followed by an annealing section. Subsequently, the film is then cooled and may be subjected to further treatment, such as a surface treatment (for example corona treatment or flame treatment). The film may also be metallized as described in U.S. Pat. No. 4,692,380 to Reid. While corona and flame treatment typically occurs immediately following orientation and prior to the initial roll up, metallizing is typically performed at a separate time and location.

Figure 4:
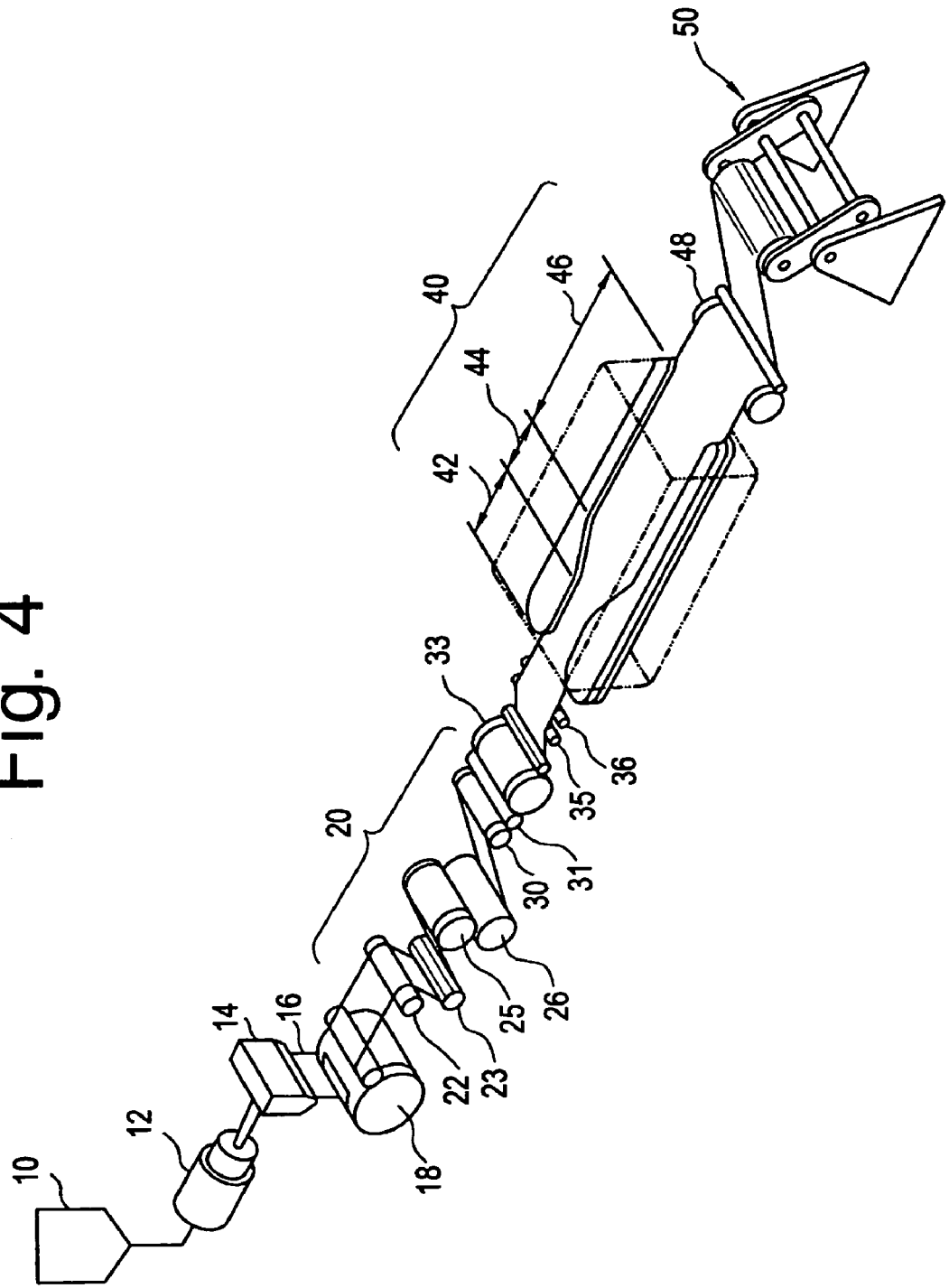
FIG. 4 illustrates a tenter-frame process for producing biaxially oriented films.

FIG. 4 illustrates the apparatus described in the Hanyu et al. patent that may be employed in producing biaxially-oriented polyolefin film in accordance with the present invention. In FIG. 4, a source of molten polymer is supplied from a heated hopper 10 to an extruder 12 and from there to a slot die 14 which produces a flat, relatively thick film 16 at its output. Film 16 is applied over a chill roller 18, and it is cooled to a suitable temperature. The film is drawn off the chill roller 18 to a stretching section 20 to which the machine direction orientation occurs by means of idler rollers 22 and 23 that lead to preheat rollers 25 and 26.

As the film is drawn off the chill roller 18 and passed over the idler rollers, it is cooled to a temperature of about 30–60° C. In stretching the film in the machine direction, it is heated by preheat rollers 25 and 26 to an incremental temperature increase of about 60–100° C. and is oriented by fast roller 31 operating at a suitable speed greater than that of the preheat rollers in order to orient the film in the machine direction.

As the oriented film is withdrawn from the fast roller 31, it is passed over a roller 33 at room temperature conditions. From here it is passed over rollers to a lateral stretching section 40 where the film is oriented by stretching in the transverse direction. The section 40 includes a preheat section 42 comprising a plurality of tandem heating rollers (not shown) where it is reheated to a temperature within the range of 130–180° C. From the preheat section 42 of the tenter frame, the film is passed to a stretching or draw section 44 where it is progressively stretched by means of tenter clips (not shown) which grasp the opposed sides of the film and progressively stretch it laterally until it reaches its maximum lateral dimension. The concluding portion of the lateral stretching phase includes an annealing section 46, such as an oven housing, where the film is heated at a temperature within the range of 130–170° C. for a suitable period in time. The annealing time helps control certain properties, and increased annealing is often specifically used to reduce shrinkage.

The biaxially oriented film is then withdrawn from the tenter frame and passed over a chill roller 48 where it is reduced to a temperature of less than about 50° C. and then applied to take-up spools on a take-up mechanism 50. Typically, the initial orientation in the machine direction is carried out at a somewhat lower temperature than the orientation in the lateral dimension. For example, the film may be stretched in the machine direction at a temperature of about 120° C. and stretched in the lateral dimension at a temperature of 160° C.

Just as crosslinking and irradiation crosslinking are useful for biaxial oriented films produced using a double bubble process, such crosslinking may also be advantageous when the film is oriented with a tenter frame mechanism. For example, irradiation equipment when placed between chill roll 18 and machine direction orientation section 20 permits the orientation to occur after crosslinking. Irradiation equipment can also be located after chill roller 48 when crosslinking of the fully oriented film is required.

Various properties are used to measure the performance of polyolefin compositions and films made therefrom. Described below are some of the methods used.

Tensile Strength: The tensile strength including stress and elongation at break were measured for samples of produced film by ASTM method D882. Test speed was 2 inch/minute and a jaw separation of 4". ASTM method D882 was similarly used to measure tangent modulus, peak stress, energy to peak load and % elongation at peak. For the latter measurements a test speed of 0.4 inch/minute and a jaw separation of 4" were used.

Biaxially oriented film produced of the various compositions was tested for processability as well optical qualities. For example, bubble stability of the secondary bubble in the double bubble process is one measure of processability. Another measure of processability is consistency in the gauge of the film produced. Similarly, optical qualities can be categorized by haze, gloss, etc.

Optical properties were determined on samples stretched to an average thickness of 0.6 mils (15 μm). Optical properties include haze, transmittance and gloss. Haze and luminous transmittance were determined in accordance with ASTM D1003. In general, lower haze films will have higher transmittance. Specular gloss was measured generally in accordance with ASTM D2457. ASTM D2457 refers to measurements at 20, 45 and 65 degrees.

Slip and hot slip refer to the tendency of packages to cling to each other. Coefficient of friction (COF) is one measure of cold slip. As used herein, hot slip is a qualitative measure of package-package cling for packages exiting a hot air shrink tunnel. Higher hot slip refers to lower package-package cling. Conversely, low hot slip refers to higher package-package cling. As used herein hot slip is determined at a temperature from 120 to 140° Fahrenheit. This can be qualitatively monitored by comparing package to package slip of packages just leaving the shrink tunnel.

The invention is illustrated, but not limited by the following examples:

EXAMPLES

Various types of cyclic-olefin copolymers (COCs) are known in the art. In general early COCs, manufactured with Ziegler-Natta catalysts have high glass transition temperature and yield films having inferior haze values. These limitations have been overcome with recent advances in the manufacture of COCs. All of the inventive examples utilize single site catalyzed COCs (when present) with a glass transition temperature below 70° C. and a melt flow rate of approximately 1.0 at 190° C. Single site catalyzed COCs include metallocene catalyzed COCs.

Softening olefins having low glass transition temperatures such as EVA, ethylene methacrylate (EMA), VLDPE, plastomers, etc. may be used to further increase water bath shrinkage when used along with COCs in the present invention. Preferably such softening olefins are either EVA or VLDPE. Examples were produced using EVA and/or VLDPE as the softening olefin.

The compare example and inventive examples are all five layer films, produced in a double-bubble shrink film manufacturing process (e.g. FIG. 3). The compare example has outer layers comprising approximately 87% by weight LLDPE, 8% by weight EVA and 5% other additives. Both the compare and inventive examples have similar weight distributions of the various layers, i.e. approximately 15% wt. each outer layer, 15% wt. each intermediate layer and 40% wt. innermost layer.

Suitable LLDPE materials used in the examples included those having a melt index between 0.4 to 2.8 g/10 minutes and a density between 0.915 and 0.922 g/cc. Such LLDPE products are available from various vendors including products sold by Dow Chemical such as Dowlex NG 3347A or Tuflin® HS-7002, Nova Chemicals, ExxonMobil Chemical, as well as others.

Suitable EVA materials used in the examples included those having a melt flow rate between 0.5 to 3.0 g/10 minutes at 190° C. and a density between 0.915 and 0.935 g/cc. Such EVA products are available from various vendors including products sold by AT Plastics, Dow Chemical (formerly Union Carbide), DuPont, Huntsman, Chevron, as well as others.

Suitable VLDPE materials used in the examples included those having a melt flow rate between 0.5 to 5.1 g/10 minutes at 190° C. and a density between 0.86 and 0.915 g/cc. Such VLDPE products are available from various vendors including products sold by Basell Polyolefins, Dow Chemical, Nova Chemicals, ExxonMobil Chemical, Mitsui Petrochemical, Sumitomo Chemical, as well as others.

Films of the inventive example were deemed useful as high speed shrink film and relatively comparable to a polystyrene layered film. The films were biaxially oriented to a thickness of 0.60 mils, although it is common to produce such films in thicknesses of 0.30 mils to 2.0 mils. Of particular interest is the superior hot slip quality of the inventive example. By further adjusting production parameters, the films of the present invention can be made to a stable thickness of 0.30 mils.

Compare Example—0% COCs

A 5 layer shrink film in accordance with FIG. 2 was prepared using a double-bubble apparatus to a thickness of 0.60 mil. Innermost layer 1 comprised approximately 40% of the weight of the film. Two polyethylenic outer layers 2 comprised approximately 30% of the weight of the film (approximately 15% in each layer). Intermediate inner layers 3 situated between innermost layer 1 and each polyethylenic layers 2 comprised the remaining approximate 30% weight of the film (approximately evenly divided, or 15% in each layer). Composition of the film is presented in Table 1. In order to form a point of comparison, cyclic-olefin copolymer was not added to this film.

TABLE 1

| Compare Example Film | Concentration (wt %) |
|---|---|
| Polyethylenic Outer Layers 2 Composition (30% total, approx. 15% each layer) | |
| Polyethylene (LLDPE) | 87 |
| EVA | 8 |
| Additives | 5 |
| Intermediate Inner Layers 3 Composition (30% total, approx. 15% each layer)) | |
| Polyethylene (LLDPE) | 94 |
| Additives | 6 |
| Innermost Layer 1 Composition (40%) | |
| Polyethylene (LLDPE) | 95 |
| Additives | 5 |
| Total weight % COC | 0 |

Inventive Example 1—6.4% wt. COCs

A 5 layer shrink film in accordance with FIG. 2 was prepared using a double-bubble apparatus to a thickness of 0.60 mil. Innermost COC containing layer 1 comprised approximately 40% of the weight of the film. Two polyethylenic outer layers 2 comprised approximately 30% of the weight of the film (approximately 15% in each layer). Intermediate inner layers 3 situated between innermost layer 1 and each polyethylenic layers 2 comprised the remaining approximate 30% weight of the film (approximately evenly divided, or 15% in each layer). Composition of the film is presented in Table 2. Cyclic-olefin copolymer was added only to intermediate layers 3 and comprises approximately 6.4% of the total weight of the film. The amount of softening olefin (EVA) included was 8% by weight of each outer layer, or 2.4% by weight of the film.

TABLE 2

Inventive Example 1 Film

|  | Concentration (wt %) |
|---|---|
| Polyethylenic Outer Layers 2 Composition (30% total, approx. 15% each layer) |  |
| Polyethylene (LLDPE) | 87 |
| EVA | 8 |
| Additives | 5 |
| Intermediate Inner Layers 3 Composition (30% total, approx. 15% each layer)) |  |
| Polyethylene (LLDPE) | 94 |
| Additives | 6 |
| Innermost Layer 1 Composition (40%) |  |
| Polyethylene (LLDPE) | 79 |
| Cyclic-olefin Copolymer (COC) | 16 |
| Additives | 5 |
| Total weight % COC | 6.4 |

Inventive Example 2—11.2% wt. COCs

A 5 layer shrink film in accordance with FIG. 2 was prepared using a double-bubble apparatus to a thickness of 0.60 mil. Innermost COC containing layer 1 comprised approximately 40% of the weight of the film. Two polyethylenic outer layers 2 comprised approximately 30% of the weight of the film (approximately 15% in each layer). Intermediate inner layers 3 situated between innermost layer 1 and each polyethylenic layers 2 comprised the remaining approximate 30% weight of the film (approximately evenly divided, or 15% in each layer). Composition of the film is presented in Table 3. Cyclic-olefin copolymer was added to intermediate layers 3 and innermost layer 1. COC comprises approximately 11.2% of the total weight of the film. The amount of softening olefin (EVA) was 8% by weight of each outer layer, or 2.4% by weight of the film.

TABLE 3

Inventive Example 2 Film

|  | Concentration (wt %) |
|---|---|
| Polyethylenic Outer Layers 2 Composition (30% total, approx. 15% each layer) |  |
| Polyethylene (LLDPE) | 87 |
| EVA | 8 |
| Additives | 5 |
| Intermediate Inner Layers 3 Composition (30% total, approx. 15% each layer)) |  |
| Polyethylene (LLDPE) | 79 |
| Cyclic-olefin Copolymer (COC) | 16 |
| Additives | 5 |
| Innermost Layer 1 Composition (40%) |  |
| Polyethylene (LLDPE) | 79 |
| Cyclic-olefin Copolymer (COC) | 16 |
| Additives | 5 |
| Total weight % COC | 11.2 |

Processability of the inventive example 2 film was good to very good. As compared to the films of compare example and inventive example 1, this film had increased stiffness and tensile strength with no sacrifice in haze value.

Inventive Example 3—21% COCs

A 5 layer shrink film in accordance with FIG. 2 was prepared using a double-bubble apparatus to a thickness of 0.60 mil. Innermost COC containing layer 1 comprised approximately 40% of the weight of the film. Two polyethylenic outer layers 2 comprised approximately 30% of the weight of the film (approximately 15% in each layer). Intermediate inner layers 3 situated between innermost layer 1 and each polyethylenic layers 2 comprised the remaining approximate 30% weight of the film (approximately evenly divided, or 15% in each layer). Composition of the film is presented in Table 4. Cyclic-olefin copolymer was added to intermediate layers 3 and innermost layer 1. COC comprises approximately 11.2% of the total weight of the film. The amount of softening olefin included (EVA) was 8% by weight of each outer layer, or 2.4% by weight of the film.

TABLE 4

Inventive Example 3 Film

|  | Concentration (wt %) |
|---|---|
| Polyethylenic Outer Layers 2 Composition (30% total, approx. 15% each layer) |  |
| Polyethylene (LLDPE) | 87 |
| EVA | 8 |
| Additives | 5 |

TABLE 4-continued

Inventive Example 3 Film

| | Concentration (wt %) |
|---|---|
| Intermediate Inner Layers 3 Composition (30% total, approx. 15% each layer)) | |
| Polyethylene (LLDPE) | 65 |
| Cyclic-olefin Copolymer (COC) | 30 |
| Additives | 5 |
| Innermost Layer 1 Composition (40%) | |
| Polyethylene (LLDPE) | 65 |
| Cyclic-olefin Copolymer (COC) | 30 |
| Additives | 5 |
| Total weight % COC | 21.0 |

Processability of the inventive example 3 film was good to very good. As compared to the other example films, this film had increased stiffness and tensile strength with no sacrifice in haze value. A slight loss of gloss was noted in comparison to inventive example 2 film.

Results for Examples having 2.4% Softening Olefin

Results for the first set of example shrink film testing is provided in Table 5. Inventive examples 2 and 3 were concluded to be commercially comparable to the polystyrene layer comparison film. The inventive example 3 is particularly notable for its improved modulus and higher water shrinkage amounts. FIG. 5 shows various data points for comparing resulting film modulus vs. amount of COC in the film (modulus is average of machine direction and transverse direction modulus). These first three inventive films are plotted as the line of FIG. 5. As shown, the modulus approaches 70 kpsi for 10% or more COC.

Inventive Example 4—14% COCs, 9.4% Softening Olefin

A 5 layer shrink film in accordance with FIG. 2 was prepared using a double-bubble apparatus to a thickness of 0.60 ml. Innermost COC containing layer 1 comprised approximately 40% of the weight of the film. Two polyethylenic outer layers 2 comprised approximately 30% of the weight of the film (approximately 15% in each layer). Intermediate inner layers 3 situated between innermost layer 1 and each polyethylenic layers 2 comprised the remaining approximate 30% weight of the film (approximately evenly divided, or 15% in each layer). Composition of the film is presented in Table 6. Cyclic-olefin copolymer was added to intermediate layers 3 and innermost layer 1. COC comprises approximately 14.0% of the total film weight. Softening olefin was added in nearly equal percentages to all layers. Outer layers additives comprised in large measure antiblock material, while inner and core layer additives comprised in large measure slip enhancing materials.

TABLE 6

Example 4 Film Composition

| | Inventive Film Composition (wt %) |
|---|---|
| Polyethylenic Outer Layers 2 Composition (30% total, approx. 15% each layer | |
| Polyethylene (LLDPE) | 87 |
| EVA | 8 |
| Additives | 5 |

TABLE 5

Film Properties - Example Films 2.4% Softening Olefin

| 60 GAUGE (0.60 MILS) | COMPARE FILM | EX. 1 FILM | EX. 2 FILM | EX. 3 FILM | POLYSTYRENE LAYER FILM |
|---|---|---|---|---|---|
| % COCs | 0% | 6.4% | 11.2% | 21.0% | |
| Gloss | 131 | 119 | 120 | 107 | 121 |
| Haze % | 3.2 | 4.2 | 4.0 | 4.1 | 3.1 |
| COF | 0.20 | 0.14 | 0.15 | 0.15 | 0.61 |
| Modulus (MD) Kpsi | 42 | 56 | 68 | 83 | 85 |
| Modulus (TD) Kpsi | 49 | 72 | 76 | 92 | 90 |
| Tensile Strength (MD) Kpsi | 19 | 17 | 20 | 19 | 17 |
| Tensile Strength (TD) Kpsi | 20 | 20 | 20 | 17 | 20 |
| Elongation (MD) % | 132 | 97 | 107 | 91 | 106 |
| Elongation (TD) % | 155 | 127 | 129 | 108 | 97 |
| Oven Shrinkage (MD) % | 64 | 50 | 50 | 46 | 69 |
| Oven Shrinkage (TD) % | 66 | 54 | 55 | 48 | 75 |
| Water Shrinkage (MD) % | 12 | 14 | 16 | 22 | 41 |
| Water Shrinkage (TD) % | 22 | 23 | 26 | 35 | 43 |
| Tear Strength (MD) gr/6ply | 12 | 9 | 8 | 9 | 7 |
| Tear Strength (TD) gr/6ply | 14 | 18 | 14 | 22 | 19 |

TABLE 6-continued

Example 4 Film Composition

| | Inventive Film Composition (wt %) |
|---|---|
| Intermediate Inner Layers 3 Composition (30% total, approx. 15% each layer)) | |
| Polyethylene (LLDPE) | 65 |
| EVA | 10 |
| Cyclic-olefin Copolymer (COC) | 20 |
| Additives | 5 |
| Innermost Layer 1 Composition (40%) | |
| Polyethylene (LLDPE) | 65 |
| EVA | 10 |
| Cyclic-olefin Copolymer (COC) | 20 |
| Additives | 5 |
| Total weight % COC | 14.0 |

Inventive Example 5—17.5% COCs, 13.6% Softening Olefin

A 5 layer shrink film in accordance with FIG. 2 was prepared using a double-bubble apparatus to a thickness of 0.60 mil. Innermost COC containing layer 1 comprised approximately 40% of the weight of the film. Two polyethylenic outer layers 2 comprised approximately 30% of the weight of the film (approximately 15% in each layer). Intermediate inner layers 3 situated between innermost layer 1 and each polyethylenic layer 2 comprised the remaining approximate 30% weight of the film (approximately evenly divided, or 15% in each layer). Composition of the film is presented in Table 7. Cyclic-olefin copolymer was added to intermediate layers 3 and innermost layer 1. COC comprises approximately 17.5% of total film weight. Softening olefin was added to all layers with inner layers having double the percentage as the outer layers. Outer layers additives comprised in large measure antiblock material, while intermediate and core layer additives comprised in large measure slip enhancing materials.

TABLE 7

Example 5 Film Composition

| | Inventive Film Composition (wt %) |
|---|---|
| Polyethylenic Outer Layers 2 Composition (30% total, approx. 15% each layer | |
| Polyethylene (LLDPE) | 87 |
| EVA | 8 |
| Additives | 5 |
| Intermediate Inner Layers 3 Composition (30% total, approx. 15% each layer)) | |
| Polyethylene (LLDPE) | 53 |
| EVA | 16 |
| Cyclic-olefin Copolymer (COC) | 25 |
| Additives | 6 |

TABLE 7-continued

Example 5 Film Composition

| | Inventive Film Composition (wt %) |
|---|---|
| Innermost Layer 1 Composition (40%) | |
| Polyethylene (LLDPE) | 53 |
| EVA | 16 |
| Cyclic-olefin Copolymer (COC) | 25 |
| Additives | 6 |
| Total weight % COC | 17.5 |

As compared to Example 4 film, this film increased both in stiffness (modulus) and water bath shrinkage. This demonstrates that by increasing the amount of COC, the modulus can be maintained when softening olefins are increased (softening olefins increased from 9.4% to 13.6% while COC increased from 14% to 17.5%).

Inventive Example 6—15.5% COCs, 14.0% Softening Olefin

A 5 layer shrink film in accordance with FIG. 2 was prepared using a double-bubble apparatus to a thickness of 0.60 mil. Innermost COC containing layer 1 comprised approximately 40% of the weight of the film. Two polyethylenic outer layers 2 comprised approximately 30% of the weight of the film (approximately 15% in each layer). Intermediate inner layers 3 situated between innermost layer 1 and each polyethylenic layers 2 comprised the remaining approximate 30% weight of the film (approximately evenly divided, or 15% in each layer). Composition of the film is presented in Table 8. Cyclic-olefin copolymer was added to intermediate layers 3 and innermost layer 1. COC comprises approximately 15.5% of the total weight of the film. Softening olefin was added in to all layers with inner layers having double the percentage as the outer layers. As compared to Example 5, this example uses VLDPE as the softening olefin in the core layer. Outer layers additives comprised in large measure antiblock material, while inner and core layer additives comprised in large measure slip enhancing materials.

TABLE 8

Example 6 Film Composition

| | Inventive Film Composition (wt %) |
|---|---|
| Polyethylenic Outer Layers 2 Composition (30% total, approx. 15% each layer | |
| Polyethylene (LLDPE) | 87 |
| EVA | 8 |
| Additives | 5 |
| Intermediate Inner Layers 3 Composition (30% total, approx. 15% each layer)) | |
| Polyethylene (LLDPE) | 53 |
| EVA | 16 |
| Cyclic-olefin Copolymer (COC) | 25 |
| Additives | 6 |

TABLE 8-continued

Example 6 Film Composition

| | Inventive Film Composition (wt %) |
|---|---|
| Innermost Layer 1 Composition (40%) | |
| Polyethylene (LLDPE) | 58 |
| Polyethylene (VLDPE) | 17 |
| Cyclic-olefin Copolymer (COC) | 25 |
| Additives | 5 |
| Total weight % COC | 15.5 |

Results for Examples 4, 5, and 6

Results for the second set of example shrink film testing is provided in Table 9. Inventive examples 4, 5 and 6 were concluded to be commercially comparable to the polystyrene layer comparison film. Ease of manufacture was best for example 4 and worst for example 5. Interestingly the modulus and water shrinkage was identical in both the machine and transverse directions for example 4. These three examples appear as data points on FIG. 5 (i.e. not part of the line). The use of core layer VLDPE in example 6 produced comparable results to the use of EVA in example 5.

TABLE 9

Film Properties - Example Films 4, 5 and 6

| 60 GAUGE (0.60 MILS) | COMPARE FILM | EX. 4 FILM | EX. 5 FILM | EX. 6 FILM |
|---|---|---|---|---|
| % COCs | 0% | 6.4% | 17.5% | 15.5% |
| Gloss | 131 | 136 | 125 | 140 |
| Haze % | 3.2 | 3.8 | 4.1 | 3.5 |
| COF | 0.20 | 0.16 | 0.15 | 0.17 |
| Modulus (MD) Kpsi | 42 | 57 | 67 | 54 |
| Modulus (TD) Kpsi | 49 | 57 | 57 | 59 |
| Tensile Strength (MD) Kpsi | 19 | 17 | 18 | 17 |
| Tensile Strength (TD) Kpsi | 20 | 16 | 15 | 16 |
| Elongation (MD) % | 132 | 97 | 98 | 99 |
| Elongation (TD) % | 155 | 139 | 136 | 129 |
| Oven Shrinkage (MD) % | 64 | 66 | 67 | 64 |
| Oven Shrinkage (TD) % | 66 | 66 | 68 | 65 |
| Water Shrinkage (MD) % | 12 | 24 | 32 | 32 |
| Water Shrinkage (TD) % | 22 | 24 | 29 | 28 |

Inventive Example 7—17.5% COCs, 10.2% Softening Olefin

A 5 layer shrink film in accordance with FIG. 2 was prepared using a double-bubble apparatus to a thickness of 0.60 mil. Innermost COC containing layer 1 comprised approximately 40% of the weight of the film. Two polyethylenic outer layers 2 comprised approximately 30% of the weight of the film (approximately 15% in each layer). Intermediate inner layers 3 situated between innermost layer 1 and each polyethylenic layers 2 comprised the remaining approximate 30% weight of the film (approximately evenly divided, or 15% in each layer). Composition of the film is presented in Table 10. Cyclic-olefin copolymer was added to intermediate layers 3 and innermost layer 1. COC comprises approximately 17.5% of the total weight of the film. Softening olefin was added in to all layers with approximately equal percentage to each layer. Outer layers additives comprised in large measure antiblock material, while inner and core layer additives comprised in large measure slip enhancing materials.

TABLE 10

Example 7 Film Composition

| | Inventive Film Composition (wt %) |
|---|---|
| Polyethylenic Outer Layers 2 Composition (30% total, approx. 15% each layer) | |
| Polyethylene (LLDPE) | 87 |
| EVA | 8 |
| Additives | 5 |
| Intermediate Inner Layers 3 Composition (30% total, approx. 15% each layer)) | |
| Polyethylene (LLDPE) | 62 |
| EVA | 9 |
| Cyclic-olefin Copolymer (COC) | 25 |
| Additives | 4 |
| Innermost Layer 1 Composition (40%) | |
| Polyethylene (LLDPE) | 62 |
| EVA | 9 |
| Cyclic-olefin Copolymer (COC) | 25 |
| Additives | 4 |
| Total weight % COC | 17.5 |

Inventive Example 8—16.9% COCs, 17.2% Softening Olefin

A 5 layer shrink film in accordance with FIG. 2 was prepared using a double-bubble apparatus to a thickness of 0.60 mil. Innermost COC containing layer 1 comprised approximately 40% of the weight of the film. Two polyethylenic outer layers 2 comprised approximately 30% of the weight of the film (approximately 15% in each layer). Intermediate inner layers 3 situated between innermost layer 1 and each polyethylenic layers 2 comprised the remaining approximate 30% weight of the film (approximately evenly divided, or 15% in each layer). Composition of the film is presented in Table 11. Cyclic-olefin copolymer was added to all layers, including the outermost layers 2. COC comprises approximately 16.9% of the total weight of the film. Softening olefin was added in to all layers with approximately EVA used as the softening olefin in the outermost layers and VLDPE used in the other layers. The percentage of VLDPE was two or three times greater than the EVA percentage. Outer layers additives comprised in large measure antiblock material, while inner and core layer additives comprised in large measure slip enhancing materials.

TABLE 11

Example 8 Film Composition

| | Inventive Film Composition (wt %) |
|---|---|
| Polyethylenic Outer Layers 2 Composition (30% total, approx. 15% each layer) | |
| Polyethylene (LLDPE) | 78 |
| EVA | 8 |
| Additives | 4 |
| Cyclic-olefin Copolymer (COC) | 10 |
| Intermediate Inner Layers 3 Composition (30% total, approx. 15% each layer)) | |
| Polyethylene (LLDPE) | 54 |
| Polyethylene (VLDPE) | 16 |
| Cyclic-olefin Copolymer (COC) | 25 |
| Additives | 5 |
| Innermost Layer 1 Composition (40%) | |
| Polyethylene (LLDPE) | 54 |
| Polyethylene (VLDPE) | 25 |
| Cyclic-olefin Copolymer (COC) | 16 |
| Additives | 5 |
| Total weight % COC | 17.5 |

Results for Examples 7 and 8

Results for the second set of example shrink film testing is provided in Table 12. Inventive examples 7 and 8 were concluded to be commercially comparable to the polystyrene layer comparison film. Highest modulus of all example films occurred with example film 7. Examples 7 and 8 appear as data points on FIG. 5 (i.e. not part of the line).

TABLE 12

Film Properties - Example Films 7 and 8

| 60 GAUGE (0.60 MILS) | COMPARE FILM | EX. 7 FILM | EX. 8 FILM | POLYSTYRENE LAYER FILM |
|---|---|---|---|---|
| % COCs | 0% | 17.5% | 16.9% | |
| Gloss | 131 | 102 | 109 | 121 |
| Haze % | 3.2 | 3.9 | 4.9 | 3.1 |
| COF | 0.20 | 0.14 | 0.2 | 0.61 |
| Modulus (MD) Kpsi | 42 | 91 | 49 | 85 |
| Modulus (TD) Kpsi | 49 | 112 | 54 | 90 |
| Tensile Strength (MD) Kpsi | 19 | 23 | 13 | 17 |
| Tensile Strength (TD) Kpsi | 20 | 36 | 14 | 20 |
| Elongation (MD) % | 132 | 134 | 127 | 106 |
| Elongation (TD) % | 155 | 145 | 136 | 97 |
| Oven Shrinkage (MD) % | 64 | 58 | 62 | 69 |
| Oven Shrinkage (TD) % | 66 | 61 | 66 | 75 |
| Water Shrinkage (MD) % | 12 | 21 | 33 | 41 |
| Water Shrinkage (TD) % | 22 | 29 | 26 | 43 |

Inventive Example 9—16.0% COCs, 13% Softening Olefin

A 5 layer shrink film in accordance with FIG. 2 was prepared using a double-bubble apparatus to a thickness of 0.60 mil. Innermost COC containing layer 1 comprised approximately 40% of the weight of the film. Two polyethylenic outer layers 2 comprised approximately 30% of the weight of the film (approximately 15% in each layer). Intermediate inner layers 3 situated between innermost layer 1 and each polyethylenic layers 2 comprised the remaining approximate 30% weight of the film (approximately evenly divided, or 15% in each layer). Composition of the film is presented in Table 13. Cyclic-olefin copolymer was added to all layers. COC comprises approximately 16.0% of the total weight of the film. Softening olefin was added only to intermediate layers 3 and innermost layer 1 (none in outermost layers 2.) Outer layers additives comprised in large measure antiblock material, while inner and core layer additives comprised in large measure slip enhancing materials.

TABLE 13

Example 9 Film Composition

| | Inventive Film Composition (wt %) |
|---|---|
| Polyethylenic Outer Layers 2 Composition (30% total, approx. 15% each layer) | |
| Polyethylene (LLDPE) | 81 |
| Cyclic-olefin Copolymer (COC) | 15 |
| Additives | 4 |
| Intermediate Inner Layers 3 Composition (30% total, approx. 15% each layer)) | |
| Polyethylene (LLDPE) | 60 |
| Polyethylene (VLDPE) | 10 |
| Cyclic-olefin Copolymer (COC) | 25 |
| Additives | 5 |
| Innermost Layer 1 Composition (40%) | |
| Polyethylene (LLDPE) | 60 |
| Polyethylene (VLDPE) | 10 |
| Cyclic-olefin Copolymer (COC) | 25 |
| Additives | 5 |
| Total weight % COC | 16.0 |

Inventive Example 10—21.0% COCs, 18.5% Softening Olefin

A 5 layer shrink film in accordance with FIG. 2 was prepared using a double-bubble apparatus to a thickness of 0.60 mil. Innermost COC containing layer 1 comprised approximately 40% of the weight of the film. Two polyethylenic outer layers 2 comprised approximately 30% of the weight of the film (approximately 15% in each layer). Intermediate inner layers 3 situated between innermost layer 1 and each polyethylenic layers 2 comprised the remaining approximate 30% weight of the film (approximately evenly divided, or 15% in each layer). Composition of the film is presented in Table 14. Cyclic-olefin copolymer was added to all layers. COC comprises approximately 21.0% of the total weight of the film. Softening olefin was added only to intermediate layers 3 and innermost layer 1 (none in outermost layers 2.) Outer layers additives comprised in large measure antiblock material, while inner and core layer additives comprised in large measure slip enhancing materials.

TABLE 14

Example 10 Film Composition

| | Inventive Film Composition (wt %) |
|---|---|
| Polyethylenic Outer Layers 2 Composition (30% total, approx. 15% each layer) | |
| Polyethylene (LLDPE) | 81 |
| Cyclic-olefin Copolymer (COC) | 15 |
| Additives | 4 |
| Intermediate Inner Layers 3 Composition (30% total, approx. 15% each layer)) | |
| Polyethylene (LLDPE) | 45 |
| Polyethylene (VLDPE) | 15 |
| Cyclic-olefin Copolymer (COC) | 35 |
| Additives | 5 |
| Innermost Layer 1 Composition (40%) | |
| Polyethylene (LLDPE) | 45 |
| Polyethylene (VLDPE) | 15 |
| Cyclic-olefin Copolymer (COC) | 35 |
| Additives | 5 |
| Total weight % COC | 21.0 |

Inventive Example 11—25.5% COCs, 24.5% Softening Olefin

A 5 layer shrink film in accordance with FIG. 2 was prepared using a double-bubble apparatus to a thickness of 0.60 ml. Innermost COC containing layer 1 comprised approximately 40% of the weight of the film. Two polyethylenic outer layers 2 comprised approximately 30% of the weight of the film (approximately 15% in each layer). Intermediate inner layers 3 situated between innermost layer 1 and each polyethylenic layers 2 comprised the remaining approximate 30% weight of the film (approximately evenly divided, or 15% in each layer). Composition of the film is presented in Table 15. Cyclic-olefin copolymer was added to all layers. COC comprises approximately 25.5% of the total weight of the film. Softening olefin was added only to intermediate layers 3 and innermost layer 1 (none in outermost layers 2.) Outer layers additives comprised in large measure antiblock material, while inner and core layer additives comprised in large measure slip enhancing materials.

TABLE 15

Example 11 Film Composition

| | Inventive Film Composition (wt %) |
|---|---|
| Polyethylenic Outer Layers 2 Composition (30% total, approx. 15% each layer) | |
| Polyethylene (LLDPE) | 81 |
| Cyclic-olefin Copolymer (COC) | 15 |
| Additives | 4 |
| Intermediate Inner Layers 3 Composition (30% total, approx. 15% each layer)) | |
| Polyethylene (LLDPE) | 30 |
| Polyethylene (VLDPE) | 15 |
| Cyclic-olefin Copolymer (COC) | 50 |
| Additives | 5 |
| Innermost Layer 1 Composition (40%) | |
| Polyethylene (LLDPE) | 30 |
| Polyethylene (VLDPE) | 50 |
| Cyclic-olefin Copolymer (COC) | 15 |
| Additives | 5 |
| Total weight % COC | 25.5 |

Results for Examples 9, 10 and 11

Results for the second set of example shrink film testing is provided in Table 16. Inventive examples 9 and 10 were concluded to be commercially comparable to the polystyrene layer comparison film. Example 11 has comparable physical properties but the haze value is inferior. The high concentration of COC in the intermediate layers 3 is likely the caused of the high haze and indicates that no more than 40% of COC should be in an individual layer. The addition of COC to the outermost layers had a beneficial effect on the coefficient of friction. Examples 9, 10 and 11 appear as data points on FIG. 5 (i.e. not part of the line).

TABLE 16

Film Properties - Example Films 9, 10 and 11

| 60 GAUGE (0.60 MILS) | COMPARE FILM | EX. 9 FILM | EX. 10 FILM | EX. 11 FILM | POLYSTYRENE LAYER FILM |
|---|---|---|---|---|---|
| % COCs | 0% | 16.0 | 21.0 | 25.5 | |
| Gloss | 131 | 83 | 79 | 72 | 121 |
| Haze % | 3.2 | 5.0 | 3.3 | 7.0 | 3.1 |
| COF | 0.20 | 0.05 | 0.04 | 0.07 | 0.61 |
| Modulus (MD) Kpsi | 42 | 58 | 71 | 66 | 85 |
| Modulus (TD) Kpsi | 49 | 60 | 72 | 76 | 90 |

TABLE 16-continued

Film Properties - Example Films 9, 10 and 11

| 60 GAUGE (0.60 MILS) | COMPARE FILM | EX. 9 FILM | EX. 10 FILM | EX. 11 FILM | POLYSTYRENE LAYER FILM |
|---|---|---|---|---|---|
| Tensile Strength (MD) Kpsi | 19 | 19 | 22 | 18 | 17 |
| Tensile Strength (TD) Kpsi | 20 | 15 | 14 | 15 | 20 |
| Elongation (MD) % | 132 | 122 | 118 | 101 | 106 |
| Elongation (TD) % | 155 | 136 | 155 | 148 | 97 |
| Oven Shrinkage (MD) % | 64 | 61 | 67 | 68 | 69 |
| Oven Shrinkage (TD) % | 66 | 60 | 60 | 62 | 75 |
| Water Shrinkage (MD) % | 12 | 17 | 23 | 25 | 41 |
| Water Shrinkage (TD) % | 22 | 25 | 29 | 32 | 43 |

Conclusions

During development of the inventive example it was noticed that the use of COCs increases modulus in a synergistic fashion and even a relatively small % of COC dramatically improves modulus. It is determined that in order to achieve films with a modulus of 50 kpsi or higher, approximately 10% COCs needs to be present in the film. FIG. 5 illustrates how 50 kpsi or higher is achieved with the various examples discussed above. A practical upper limitation of 30% COCs is encountered due to processability limitations and cost disadvantage of high % COC.

For the outer layers, the presence of COC had a noticeable impact upon coefficient of friction. For other properties (e.g. modulus, shrink initiation temperature, etc.) the selection of the layer containing COC did not appear significant. However, the maximum percentage for any given layer is likely 40% as at higher levels haze and other optical problems occurs. An example film having 95% COC in an intermediate layer was attempted. It was found that at such high layer COC the film was too brittle to be oriented.

Inventive films may also be produced as a three layer film by combining the intermediate and core layers. However, when organic and inorganic fillers are to be incorporated, five layers are preferred.

Films of inventive examples have been successfully crosslinked using a radiation source situated after the second bubble of the double-bubble biaxial orientation process with no visual defects noticed. As discussed above, the radiation source may also be placed after the primary bubble as well.

The present invention may further comprise additives directed at improving the processability or final properties of the film. Such additives include antifog, slip enhancers, anti-block agents, combined slip and anti-block additives, ultraviolet light inhibitors and absorbers. For example, slip and antiblock additives amount to approximately 5% by weight of the example films.

Antifogging or antistatic agents can be added to the films and sheets of the present invention to increase surface conductivity and prevention of water droplet formation and attraction of dust and dirt on the film surface. These antifogging agents include, but are not limited to, glycerol mono-stearate, glycerol mono-oleate, lauric diphthalamides, ethoxylated amines, ethoxylated esters, and other additives known in the industry. When used, they may be present in amounts as high as 15% by weight of the outer film layer.

Other additives and processing aids may be added and include, for example, antioxidants (e.g., hindered phenols such as, for example, Irganox® 1010, and phosphites, e.g., Irgafos® 168, (both are registered trademarks of, and supplied by Ciba-Geigy Corporation, NY), U.V. stabilizers (including Tinuvin® 328 and Chimassorb® 944, both are registered trademarks of, and supplied by Ciba-Geigy Corporation, NY, Ampacet Corporation UV100, based on Ciba Specialty Chemical's proprietary Shelfplus®), flame retardant agents (available from A. Schulman of Akron, Ohio, Clariant of Easton, Md. and Technical Polymer Representatives of Amherst, Ohio), cling additives (e.g., polyisobutylene), slip agents (such as erucamide and/or stearamide), antiblock additives, printable additives, A. Schulman paper match additives, polar additives, colorants, and pigments, to the extent that such additives do not interfere with the shrink and adhesive properties of the films.

Exemplary classes of oils useful as processing aids include white mineral oil (such as Kaydol® oil (available from Witco), and Shellflex® 371 naphthenic oil (available from Shell Oil Company). Another suitable oil is Tuflo® oil (available from Lyondell).

Tackifiers can also be added to the polymer compositions used to prepare the films or sheets of the present invention in order to alter the glass transition temperature ($T_g$) and thus extend the available application temperature window of the film. Examples of the various classes of tackifiers include, but are not limited to, aliphatic resins, polyterpene resins, hydrogenated resins, pure monomer hydrocarbon resin, styrene/α-methylene styrene resins, mixed aliphatic-aromatic resins, hydrogenated pure monomer hydrocarbon resin, modified styrene copolymers, pure aromatic monomer copolymers, and hydrogenated aliphatic hydrocarbon resins. Examples of aliphatic resins include those available under the trade designations Escorez®, Piccotac®, Mercures®, Wingtack®, Hi-Rez®. Quintone®, Tackirol®, etc. Examples of polyterpene resins include those available under the trade designations Nirez®, Piccolyte®, Wingtack®, Zonarez®, etc. Exemplary hydrogenated resins include those available under the trade designations Escorez®), Arkon®, Clearon®), etc. Examples of mixed aliphatic-aromatic resins include those available under the trade designations Escorez®, Regalite®, Hercures®, AR®, Imprez®, Norsolene®, M, Marukarez®, Arkon®, M, Quintone®, Wingtack®, etc. Particularly preferred classes of tackifiers include the styrene/α-methylene styrene tackifiers available from Hercules and styrene/α-methyl styrene tackifiers such as Wingtack® 86, Hercotac® 1149, Eastman H-130, and the like.

Also included as a potential component of the polymer compositions used in the present invention are various organic and inorganic fillers, the identity of which depends upon the type of application for which the elastic film is to be utilized. Representative examples of such fillers include organic and inorganic fibers such as those made from asbestos, boron, graphite, ceramic, glass, metals (such as stainless steel) or polymers (such as aramid fibers) talc, carbon black, carbon fibers, calcium carbonate, alumina trihydrate, glass fibers, marble dust, cement dust, clay feldspar, silica or glass, fumed silica, alumina, magnesium oxide, magnesium hydroxide, antimony oxide, zinc oxide, barium sulfate, aluminum silicate, calcium silicate, titanium dioxide, titanates, aluminum nitride, $B_2O_3$, nickel powder or chalk.

Finally, as discussed above, crosslinking may be performed on the shrink films, either at the collapsed tube or at the fully oriented film stages of the double-bubble process. Crosslinking may be desirable for films to be used in packaging lines operating at higher temperatures or where greater inter-layer adhesion is needed.

Although the present invention has been described in terms of specific embodiments, various substitutions of materials and conditions can be made as will be known to those skilled in the art. For example, single site catalyzed LLDPE (e.g. metallocene catalyzed LLDPE) may replace LLDPE for processing to thinner gauges. Other variations will be apparent to those skilled in the art and are meant to be included herein. The scope of the invention is only to be limited by the following claims:

What is claimed is:

1. A five layer shrink film for high speed packaging lines having a modulus of 50,000 psi or higher and a haze value less than 5.0 comprising:
    a first outer layer comprising by total weight of the layer, 60% or more by weight polyethylenic polymer that has been formulated for use as outer layers in high speed packaging shrink film and further comprises 5% to 15% by weight softening olefin and 10% to 30% by weight cyclic-olefin copolymers;
    a second outer layer comprising by total weight of the layer, 60% or more by weight polyethylenic polymer that has been formulated for use as outer layers in high speed packaging shrink film and further comprises 5% to 15% by weight softening olefin and 10% to 30% by weight cyclic-olefin copolymers;
    a core cyclic-olefin copolymer containing layer;
    a first cyclic-olefin copolymer containing intennediate layer between the core layer and the first outer layer; and
    a second cyclic-olefin copolymer containing intermediate layer between the core layer and the second outer layer;
    wherein the polyethylenic polymer comprises linear low density polyethylene copolymer;
    wherein the cyclic-olefin copolymer of the five layer shrink film is a single-site catalyzed cyclic-olefin copolymer;
    wherein softening olefin copolymer comprises by total weight of the five layer shrink film from 2% to 25%;
    wherein the cyclic olefin copolymer comprises by total weight of the five layer shrink film from 10% to 30%; and
    wherein the five layer shrink film comprises less than 1% by weight polystyrene and less than 1% by eight polypropylene.

2. The film of claim 1 wherein the liner low density polyethylene copolymer comprises 1 to 10 weight percent 1-octene monomer.

3. The film of claim 1 having a thickness between 0.30 and 2.0 mils.

4. The film of claim 1 wherein the first outer layer comprises from 10% to 20% of the total weight of the film; wherein the second outer layer comprises from 10% to 20% of the total weight of the film; wherein the core layer comprises from 30% to 60% of th total weight of the film, wherein the first intermediate layer comprises from 10% to 20% of the total weight of the film; and wherein the second intermediate layer comprises from 10% to 20% of the total weight of the film.

5. The film of claim 1 cross-linked using a radiation source.

6. The film of claim 5 wherein the radiation source is active on the first collapsed tube of a double-bubble film orientation process.

7. The film of claim 5 wherein the radiation source is active on the film subsequent to full biaxial orientation.

8. A method of forming the film of claim 1, the method comprising of:
    feeding individual layer compositions into 3 or more separate extruders;
    extruding the compositions simultaneously into a biaxial film orienting means; and
    biaxially orienting the film to a thickness of 30 to 200 gauge;
    wherein a separate extruder extrudes a single homogenous composition.

9. The method of claim 8 wherein the biaxial film orienting means consists of a double-bubble film orienting process.

10. The method of claim 9 further comprising the step of crosslinking the layers by exposing the layer to radiation dosage.

11. The method of claim 10 wherein the radiation dosage is active on the first collapsed tube of double-bubble film orientation process.

12. The method of claim 8 further comprising the step of crosslinking the layers by exposing the layers to radiation dosage.

13. The method of claim 12 wherein the radiation dosage is active on the film subsequent to full biaxial orientation.

14. A three layer shrink film for high speed packaging lines having a modulus of 50,000 psi or higher and a haze value less than 5.0 comprising:
    a first outer layer comprising by weight 75% to 95% linear low density polyethylene, from 0% to 15% cyclic-olefin copolymer and from 5% to 25% softening olefin copolymer;
    a second outer layer comprising by weight 75% to 95% liner low density polyethylene, from 0% to 15% cyclic-olefin copolymer and from 5% to 25% softening olefin copolymer;
    a core cyclic-olefin copolymer containing layer;
    wherein the cyclic-olefin copolymer of the three layer shrink film is a single-site catalyzed cyclic-olefin copolymer;
    wherein softening olefin copolymer comprises by total weight of the three layer shrink film from 2% to 25%;
    wherein the cyclic-olefin copolymer comprises by total weight of the three layer shrink film from 10% to 30%; and
    wherein the three layer shrink film comprises less than 1% by weight polystyrene and less than 1% by weight polypropylene.

15. The film of claim 14 wherein the linear low density polyethylene copolymer comprises 1 to 10 weight percent 1-octene monomer.

16. The film of claim 14 having a thickness between 0.30 and 2.0 mils.

17. The film of claim 14 wherein the first outer layer comprises from 10% to 20% of the total weight of the film; wherein the second outer layer comprises from 10% to 20% of the total weight of the film; and wherein the core layer comprises from 60% to 80% of the total weight of the film.

18. The film of claim 14 crosslinked using a radiation source.

19. The film of claim 18 wherein the radiation source is active on the first collapsed tube of double-bubble film orientation process.

20. The film of claim 18 wherein the radiation source is active on the film subsequent to full biaxial orientation.

21. A method of forming film of claim 14, the method comprising of:
   feeding individual layer compositions into 2 or more separate extruders;
   extruding the compositions simultaneously into a biaxial film orienting means; and
   biaxially orienting the film to a thickness of 30 to 200 gauge;
   wherein a separate extruder extrudes a single homogenous composition.

22. The method of claim 21 wherein the biaxial film orienting means consists of a double-bubble film orienting process.

23. The method of claim 22 further comprising the step of crosslinking the layers by exposing the layers to radiation dosage.

24. The method of claim 23 wherein the radiation dosage is active on the first collapsed tube of a double-bubble film orientation process.

25. The method of claim 21 further comprising the step of crosslinking the layers by exposing the layers to radiation dosage.

26. The method of claim 25 wherein the radiation dosage is active on the film subsequent to full biaxial orientation.

* * * * *